United States Patent
Von Fange

(10) Patent No.: US 11,562,834 B2
(45) Date of Patent: Jan. 24, 2023

(54) LEAD ALLOY BARRIER TAPE SPLICE FOR DOWNHOLE POWER CABLE

(71) Applicant: SCHLUMBERGER TECHNOLOGY CORPORATION, Sugar Land, TX (US)

(72) Inventor: Christopher Von Fange, Lawrence, KS (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/150,970

(22) Filed: Oct. 3, 2018

(65) Prior Publication Data

US 2019/0103204 A1 Apr. 4, 2019

Related U.S. Application Data

(60) Provisional application No. 62/567,649, filed on Oct. 3, 2019.

(51) Int. Cl.
*H01B 7/28* (2006.01)
*H02G 1/14* (2006.01)

(52) U.S. Cl.
CPC ............... *H01B 7/28* (2013.01); *H02G 1/14* (2013.01)

(58) Field of Classification Search
CPC .......... H01B 9/006; H01B 9/02; H01B 7/046; H01B 7/28; H02G 15/117
USPC ....................................... 29/868, 825, 592.1
See application file for complete search history.

(56) References Cited

U.S. PATENT DOCUMENTS

| 3,783,057 A | * | 1/1974 | McNerney | H02G 1/145 |
| | | | | 156/49 |
| 4,273,953 A | * | 6/1981 | Guzy | H02G 15/1806 |
| | | | | 174/DIG. 8 |
| 4,370,518 A | * | 1/1983 | Guzy | H02G 15/1806 |
| | | | | 156/49 |

(Continued)

FOREIGN PATENT DOCUMENTS

| EP | 0209899 A2 | 1/1987 |
| EP | 0887807 A1 | 12/1998 |

(Continued)

OTHER PUBLICATIONS

International Search Report and Written Opinion for related PCT Application Serial No. PCT/US2016/034203, dated Sep. 5, 2016, 9 pages.

*Primary Examiner* — Peter Dungba Vo
*Assistant Examiner* — Azm A Parvez

(57) ABSTRACT

A technique facilitates splicing of a power cable including splicing of a protective lead barrier. According to the technique, the power cable comprises conductors which form individual phases of a multi-phase conductor assembly. The conductors may be individually spliced for each phase of the multi-phase conductor assembly. Subsequently, splicing of the protective lead barrier may be performed by utilizing a lead based tape which is wrapped, e.g. helically wrapped, around the conductors. The wrapping technique provides a gas seal with respect to each individual insulated conductor within the multi-phase conductor assembly. Depending on the specifics of a given application and environment, additional layers may be added to ensure formation of a desirable splice.

13 Claims, 6 Drawing Sheets

(56) References Cited

U.S. PATENT DOCUMENTS

| | | | |
|---|---|---|---|
| 4,769,514 A | 9/1988 | Uematsu et al. | |
| 8,674,228 B2 | 3/2014 | Dion et al. | |
| 9,322,245 B2 * | 4/2016 | Nicholson | E21B 17/025 |
| 2010/0065302 A1 * | 3/2010 | Nesbitt | E21B 17/028 174/116 |
| 2015/0110451 A1 * | 4/2015 | Blazer | G02B 6/4432 385/103 |
| 2017/0179635 A1 * | 6/2017 | Painter | H02G 3/22 |
| 2017/0328156 A1 * | 11/2017 | Shepler | E21B 23/01 |

FOREIGN PATENT DOCUMENTS

| | | | |
|---|---|---|---|
| JP | 02135620 | 5/1990 | |
| JP | 07246438 A * | 9/1995 | |
| JP | 11273466 | 10/1999 | |
| WO | WO-2016191508 A1 * | 12/2016 | H01B 7/2825 |
| WO | WO2016191508 A1 | 12/2016 | |

* cited by examiner

LEAD ALLOY BARRIER TAPE SPLICE FOR DOWNHOLE POWER CABLE

CROSS-REFERENCE TO RELATED APPLICATION

The present document is based on and claims priority to U.S. Provisional Application Ser. No. 62/567,649, filed Oct. 3, 2017, which is incorporated herein by reference in its entirety.

BACKGROUND

In many hydrocarbon well applications, power cables are employed to deliver electric power to various devices. For example, power cables are used to deliver electric power to electric submersible pumping systems which may be deployed downhole in wellbores. The power cables are subjected to harsh working environments containing corrosives, e.g. corrosive gases, elevated temperatures, high pressures, and vibrations. To protect power cable conductors from gases such as carbon dioxide ($CO_2$) and hydrogen sulfide ($H_2S$), an extruded continuous lead barrier is provided around the conductors to block gas permeation. However, the continuous lead barrier can create difficulties with respect to splicing a power cable during repair operations or other cable related operations. Such repairs are particularly difficult if a suitable heat source and soldering capability are not available.

SUMMARY

In general, a methodology and system are provided which facilitate splicing of a power cable including splicing of a protective lead barrier. According to the technique, the power cable comprises conductors, e.g. copper conductors, which form individual phases of a multi-phase conductor assembly. The conductors may be individually spliced for each phase of the multi-phase conductor assembly. Additionally, splicing of the protective lead barrier may be performed by utilizing a lead based tape which is wrapped, e.g. helically wrapped, around the conductors. The wrapping technique provides a gas seal with respect to each individual insulated copper conductor within the multi-phase conductor assembly. Depending on the specifics of a given application and environment, additional layers may be added to ensure formation of a desirable splice.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a methodology and system which facilitate splicing of a power cable including splicing of a protective lead barrier. According to the technique, the power cable comprises conductors, e.g. copper conductors, which form individual phases of a multi-phase conductor assembly. By way of example, the power cable may have three copper conductors for delivering three-phase power to an electric submersible pumping system.

The conductors may be individually spliced for each phase of the multi-phase conductor assembly. Additionally, splicing of the protective lead barrier may be performed by utilizing a lead based tape which is wrapped around the conductors. For example, the lead based tape may be wrapped helically through the splice region from one end of a protective lead barrier to the other for each phase. In some embodiments, the lead based tape may utilize an additional layer or layers wrapped in, for example, a cross pattern to ensure production against gas permeation.

An example of the lead based tape may be a lead alloy barrier tape formed with a Pb—Sn—Sb crystal structure and having a suitable adhesive to enable the tape to bond to itself after application of pressure to thus form the gas barrier. As a result, the spliced, protective lead barrier protects against corrosive gases without using a heat source or soldering to form the sealed environment for the conductors. The wrapping technique may be employed to provide a gas seal with respect to each individual insulated copper conductor within the multi-phase conductor assembly. Depending on the specifics of a given application and environment, additional layers may be added to ensure formation of a desirable splice.

Figure 1:
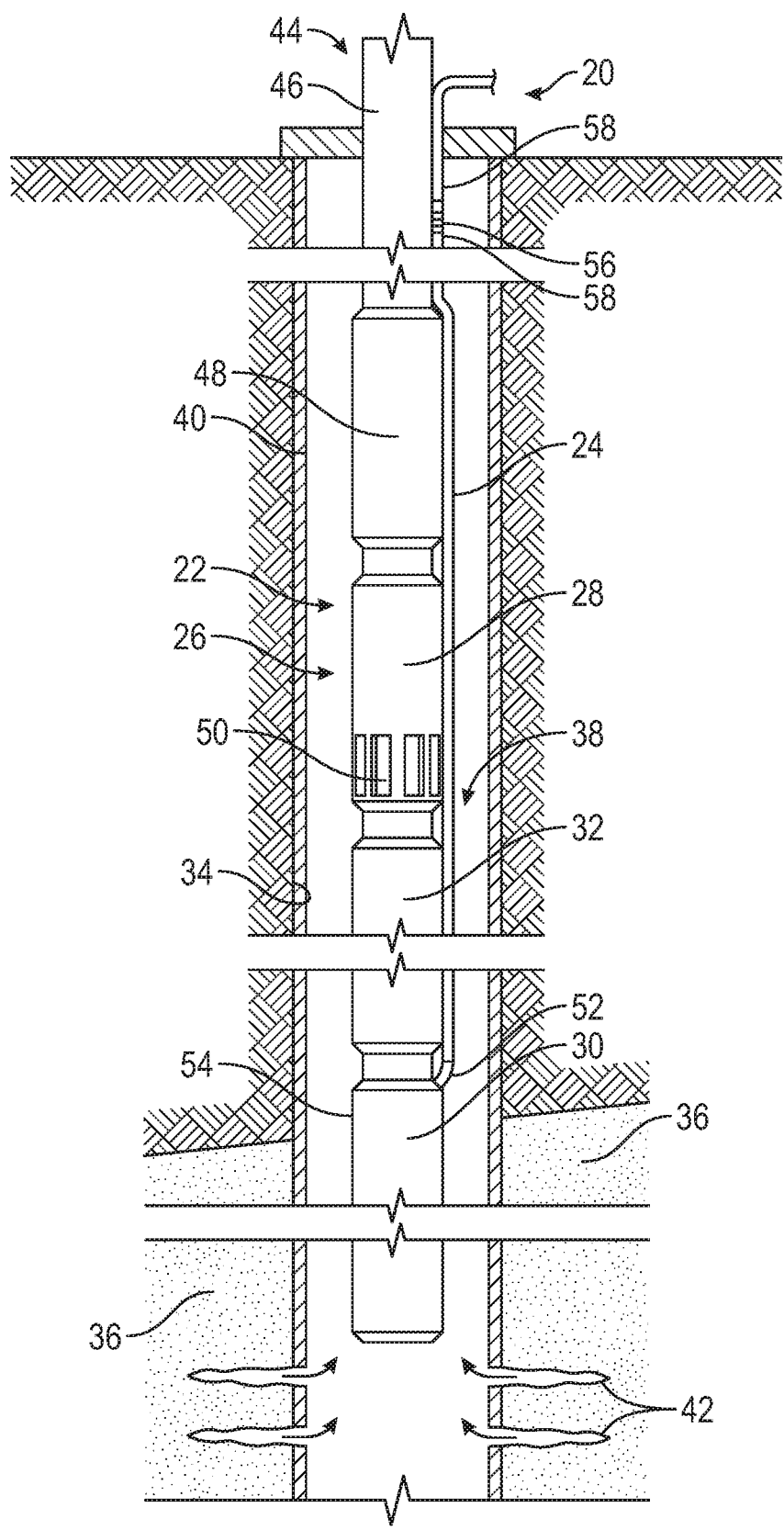
FIG. 1 is a schematic illustration of a well system comprising an example of an electric power cable coupled with an electric submersible pumping system, according to an embodiment of the disclosure.

Referring generally to FIG. 1, a well system 20 is illustrated as comprising an electrically powered system 22 which receives electric power via an electric power cable 24. By way of example, the electrically powered system 22 may be in the form of an electric submersible pumping system 26, and the power cable 24 may be constructed to withstand high temperatures and harsh environments even when spliced. Although the electric submersible pumping system 26 may have a wide variety of components, examples of such components comprise a submersible pump 28, a submersible motor 30, and a motor protector 32.

In the example illustrated, electric submersible pumping system 26 is designed for deployment in a well 34 located within a geological formation 36 containing, for example, petroleum or other desirable production fluids. A wellbore 38 may be drilled and lined with a wellbore casing 40, although the electric submersible pumping system 26 (or other type of electrically powered system 22) may be used in open hole wellbores or in other environments exposed to high temperatures and harsh conditions. In the example illustrated, however, casing 40 may be perforated with a plurality of perforations 42 through which production fluids flow from formation 36 into wellbore 38. The electric submersible pumping system 26 may be deployed into a wellbore 38 via a conveyance or other deployment system 44 which may comprise tubing 46, e.g. coiled tubing or production tubing. By way of example, the conveyance 44 may be coupled with the electrically powered system 22 via an appropriate tubing connector 48.

In the example illustrated, electric power is provided to submersible motor 30 by electric power cable 24. The submersible motor 30, in turn, powers submersible pump 28 which draws in fluid, e.g. production fluid, into the pumping system through a pump intake 50. The fluid is produced or moved to the surface or other suitable location via tubing 46. However, the fluid may be pumped to other locations along other flow paths. In some applications, for example, the fluid may be pumped along an annulus surrounding conveyance 44. In other applications, the electric submersible pumping system 26 may be used to inject fluid into the subterranean formation or to move fluids to other subterranean locations.

As described in greater detail below, the electric power cable 24 is designed to consistently deliver electric power to the submersible pumping system 26 over long operational periods when subjected to high temperatures due to high voltages and/or high temperature environments. The construction of power cable 24 also facilitates long-term operation in environments having high pressures, deleterious fluids, and/or other harsh conditions. The power cable 24 is connected to the corresponding, electrically powered component, e.g. submersible motor 30, by an electrical connector 52, e.g. a suitable pothead assembly. The electrical connector 52 provides sealed and protected passage of the power cable conductor or conductors through a housing 54 of submersible motor 30.

Depending on the application, the power cable 24 may comprise a plurality of electrical conductors protected by the insulation system. In various submersible pumping applications, the electrical power cable 24 is configured to carry three-phase current, and submersible motor 30 comprises a three-phase motor powered by the three-phase current delivered through the three electrical conductors of power cable 24. Sometimes, the power cable 24 is spliced. In the illustrated embodiment, for example, the power cable 24 comprises a splice 56 which has been prepared according to methodologies described herein so as to protect the electrical conductors, e.g. copper conductors, within the power cable. The splice 56 joins exposed ends 58 of power cable 56.

Figure 2:
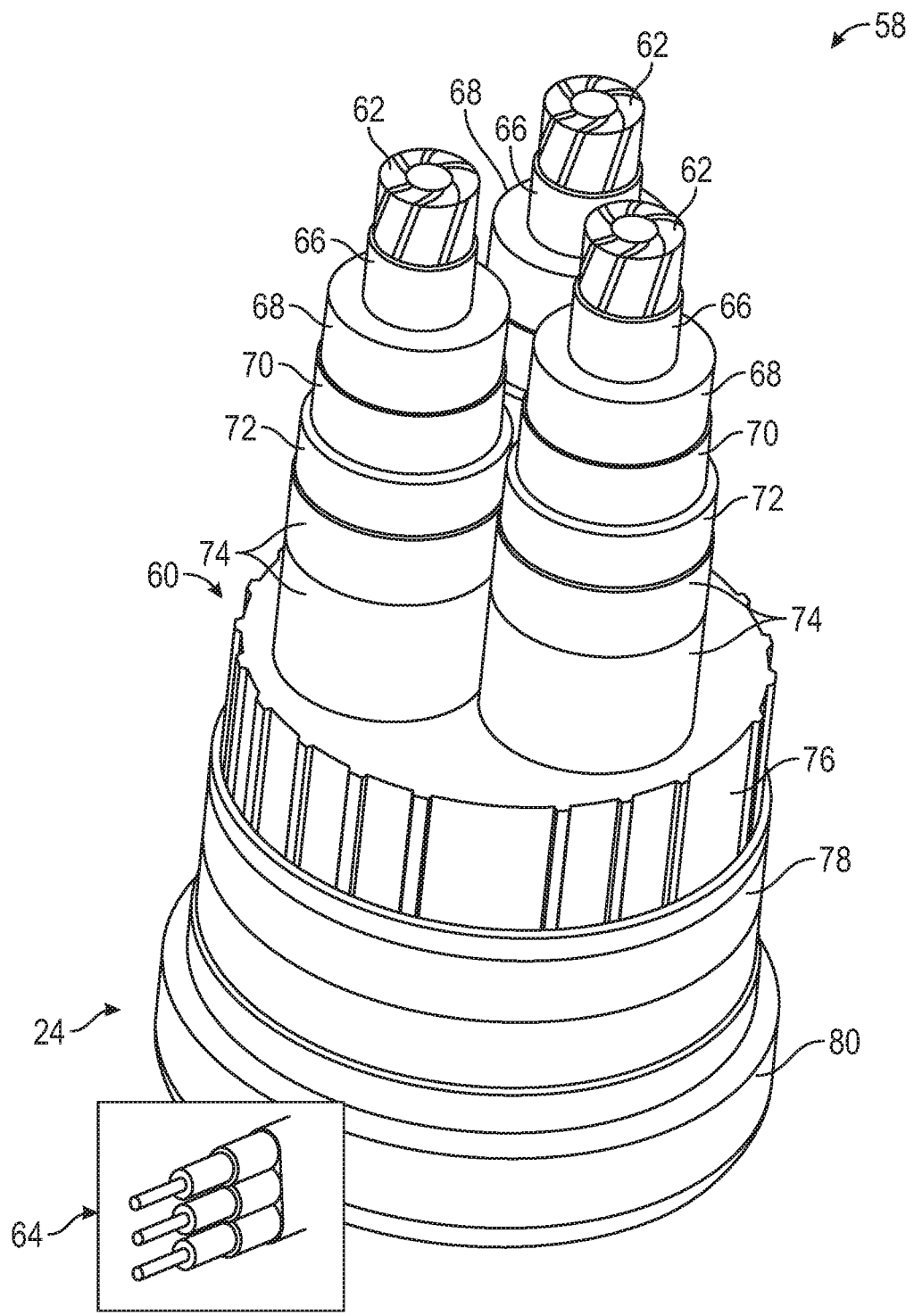
FIG. 2 is an orthogonal view of an example of a power cable having a multi-phase conductor assembly with an end exposed for splicing, according to an embodiment of the disclosure.

Referring generally to FIG. 2, an example of electric power cable 24 is illustrated. In this example, the power cable 24 is illustrated with one of the exposed ends 58 which can be spliced via splice 56 with a similar exposed end 58. In this example the power cable 24 comprises a multi-phase conductor assembly 60 having a plurality of electrical conductors 62 for the separate phases. By way of example, the power cable 24 may be in the form of a three-phase power cable having three copper conductors 62 for supplying the three-phase power to, for example, electric submersible pumping system 26.

The power cable 24 may be constructed with a variety of protective layers, insulative layers, and other layers depending on the application and environment in which it is used. The number of conductors 62 also may vary according to the parameters of a given application and may be arranged in, for example, a generally circular configuration as illustrated or a generally flat configuration as illustrated in inset 64. In the circular/round example illustrated in FIG. 2, however, the power cable 24 comprises a plurality of the electrical conductors 62, e.g. three electrical conductors, which may be made from copper or other suitable, conductive material.

In the illustrated example, each conductor 62 is surrounded by a conductor shield 66, an insulation layer 68, and an insulation shield 70. A metallic shield 72 may be in the form of a protective lead layer and may be located at a suitable position such as a position surrounding the insulation shield 70. The protective lead layer 72 may be surrounded by at least one barrier layer 74, e.g. two barrier layers, to form individual conductor assemblies. The plurality of conductor assemblies may be seated in a cable jacket 76 which may be formed of an insulative material. The cable jacket 76 may be surrounded by an armor structure having, for example, a first layer of armor 78 and a second layer of armor 80.

Depending on the parameters of a given application, the various components of power cable 24 may be made from a variety of materials. By way of example, the conductors 62 may be made of copper and the conductor shields 66 may be made from a high density polyethylene (HDPE), polypropylene, or ethylene propylene diene material (EPDM). The insulation layer 68 may be made from similar materials or other suitable insulation materials for use in a downhole, high temperature environment. The insulation shield 70 may be optional and may be made from various materials having voltage ratings in excess of, for example, about 5 kV. The metallic shield/protective lead layer 72 may be formed from a suitable lead alloy, such as a lead alloy having a Pb—Sn—Sb crystal structure. The barrier layers 74 may be formed from a fluoropolymer or other suitable material and the cable jacket 76 may be formed from an oil resistant EPDM or nitrile rubber. The one or more layers of armor 78, 80 may be formed from metal materials such as galvanized steel, stainless steel, MONEL™ or other suitable materials.

Although the exposed end 58 for combination with a similar exposed end 58 via splice 56 is illustrated as having the three ends of the copper conductors 62 cut to a similar length, the splice also may stagger the lengths. For example, the three conductors 62 may be cut to three different lengths, e.g. 3 inches apart, and then the insulation layers and protective lead layer 72 of each conductor 62 may be removed to expose the bare end of each conductor 62.

Figure 3:
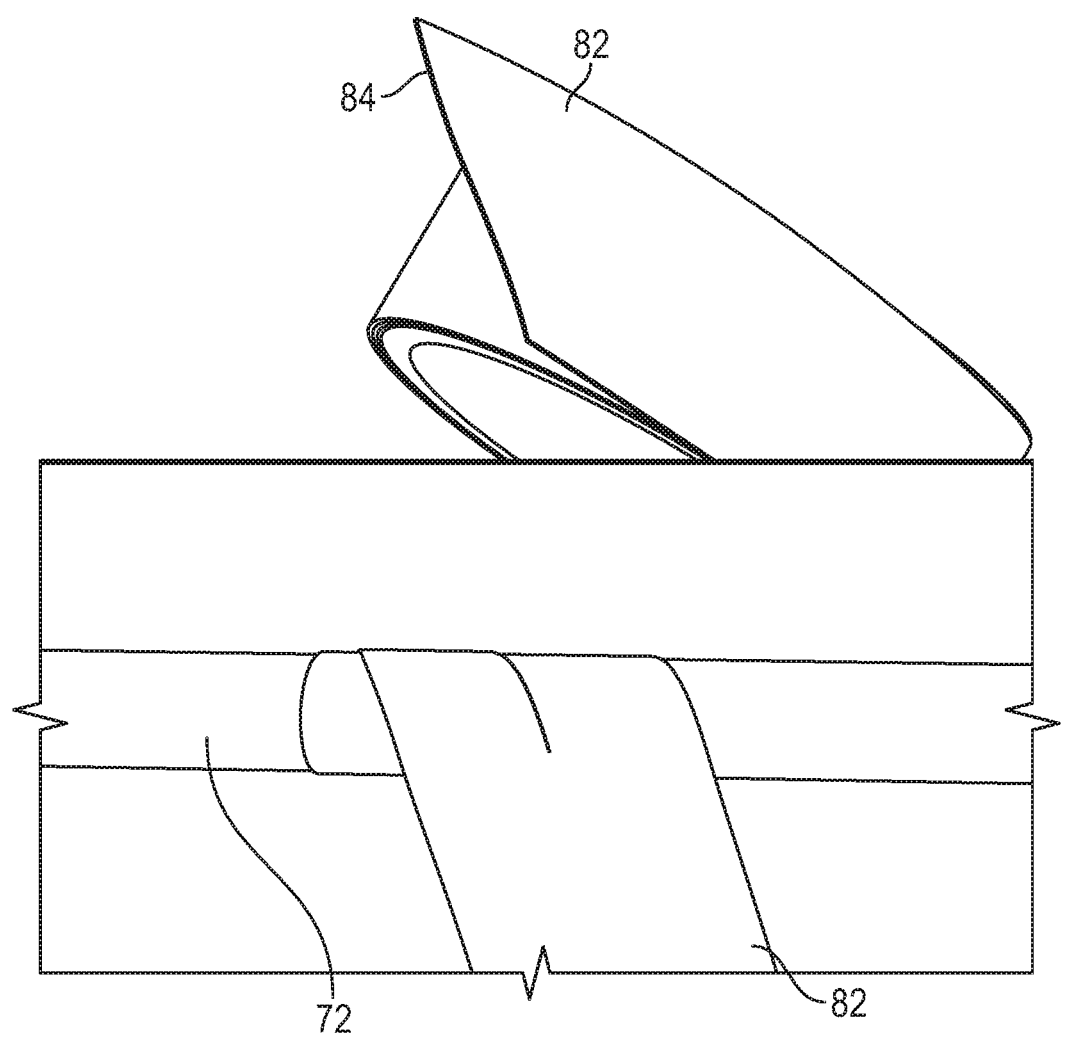
FIG. 3 is an illustration of a lead alloy barrier tape which may be used to spice ends of a protective lead barrier in the power cable, according to an embodiment of the disclosure.
Figure 4:
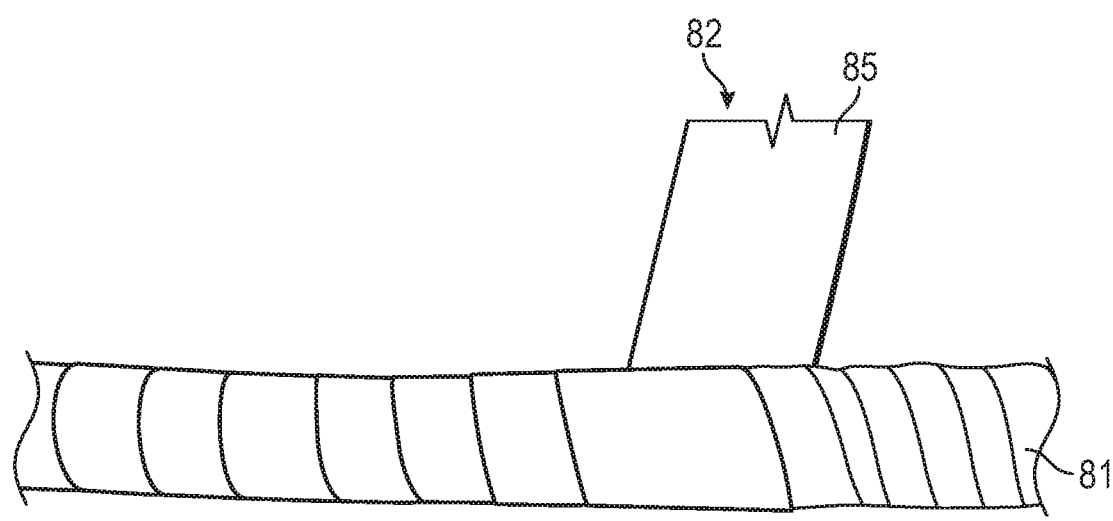
FIG. 4 is an illustration of the lead alloy barrier tape being applied during a splicing operation, according to an embodiment of the disclosure.

According to an example, the exposed copper ends of the conductors 62 of one cable end 58 are aligned with corresponding copper ends of corresponding conductors 62 of an adjacent cable end 58 to be spliced. The copper ends may be joined with, for example, a crimping sleeve or a pneumatic cold weld. The joined conductors are then sanded and polished to remove sharp corners. As illustrated in FIGS. 3 and 4, the corresponding joined conductors 62 may then be protected via a plurality of taped layers.

For example, a high strain dielectric tape 81, e.g. a high strain fluorinated ethylene propylene (FEP) tape, may be used to cover the joined area of the conductors 62 for each phase to allow for a reduction in dielectric stress by filling in contours and discontinuities across the joint area (see FIG. 4). The ends of the protective lead layer 72 may then be smoothed, e.g. sanded and polished, to facilitate bonding of a lead alloy barrier tape 82. The lead alloy barrier tape 82 may be wrapped along the joined conductors 62 of each phase from one end of the protective lead layer 72 (of a first cable end 58) to the corresponding end of protective lead layer 72 (of a second, adjacent cable end 58 being spliced to the first cable end 58) (see FIGS. 3 and 4). In other words, the lead alloy barrier tape 82 overlays corresponding ends of the protective lead layer 72 and extends over the joined conductors 62 of each phase being spliced. Consequently, a continuous lead barrier is provided through the splice.

A high modulus tape, e.g. a high modulus polytetrafluoroethylene (PTFE) tape, may then be wrapped around the lead alloy barrier tape to provide an insulating material through splice 56 (see FIGS. 7 and 8 along with description below). The lead alloy barrier tape and PTFE tape cooperate to continue the protective lead layer 72 through the splice 56 and to thus block gas exchange inside the splice 56.

Referring again to FIG. 3, an example of the lead alloy barrier tape 82 is illustrated. In this example, the lead alloy barrier tape 82 is provided with a termination end 84 (see top of FIG. 3) which may be cut to generally match an angle of wrapping. By way of example, the lead alloy barrier tape 82 may be wrapped around joined conductors 62 of each phase in a helical pattern extending through the region of splice 56 as illustrated in FIG. 4. An adhesive 85 of the barrier tape 82 ensures adherence and retention of the lead alloy barrier tape 82 in the desired pattern, e.g. in a desired helix. Depending on the parameters of a given application, the adhesive 85 may be part of the barrier tape 82 or applied separately. The helical wrap may be initiated at the end of protective lead layer 72 extending from one cable end 58 (see bottom of FIG. 3) and wrapped until it covers the end of the corresponding protective lead layer 72 extending from the adjacent cable end 58. This helical wrapping may be performed about each conductor 62 of the power cable 24 to form the overall splice 56.

Figure 5:
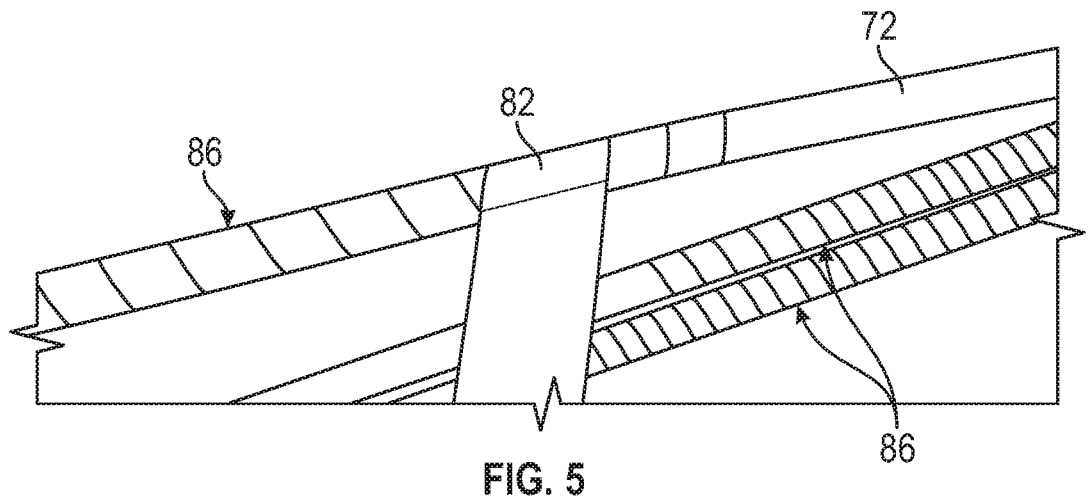
FIG. 5 is an illustration of the lead alloy barrier tape being applied to form a cross pattern during the splicing operation, according to an embodiment of the disclosure.

By way of example, the helical wrapping through the region of splice 56 may be arranged in a helix having a 50% overlap (or other suitable overlap) which enables the lead alloy barrier tape 82 to adhere and bond to itself via adhesive 85. The wrapping may be terminated at an angle matching the angle of the helix. A forming tool may be used to apply pressure along the wrapped lead alloy barrier tape 82 so as to activate the adhesive 85 and bond the overlapping layers of barrier tape 82. In some embodiments, a return pass may be helically wrapped with, for example, a 50% overlap to form a cross pattern 86 through the taped region after pressure is applied, as illustrated in FIG. 5. Additional passes of overlapping, wrapped lead alloy barrier tape 82 may be applied and extended past the ends of the underlying wraps in some applications.

The adhesive 85 may be in the form of a variety of adhesives, e.g. an acrylic based adhesive, resistant to hydrolysis and solvent attack at elevated downhole temperatures of, for example, 400° F. to 450° F. The adhesive 85 ensures sealing between overlapping portions of the lead alloy barrier tape 82 and between the lead alloy barrier tape 82 and the smoothed ends of protective lead layer 72. Use of the forming tool, e.g. pressure application tool, can help ensure a desired activation of the adhesive 85 and thus sealing along the splice 56.

Figure 6:
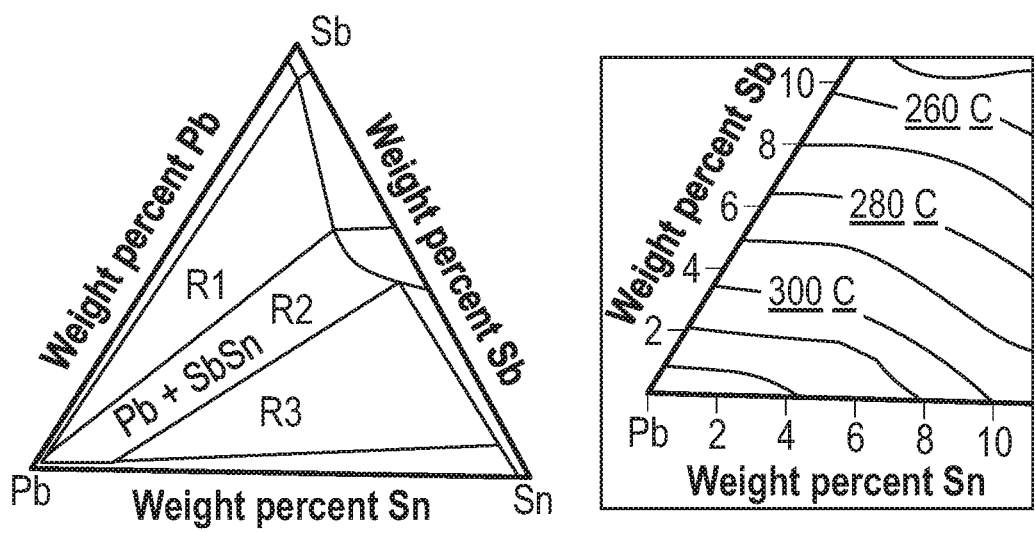
FIG. 6 is an illustration providing diagrams which show examples of constituents which may be used to form the lead alloy barrier tape, according to an embodiment of the disclosure.

The lead alloy barrier tape 82 may be constructed with a variety of lead alloys. In FIG. 6, for example, a ternary phase diagram (left side) and a ternary melt diagram (right side) are provided to illustrate examples of suitable lead alloys for use in the barrier tape 82. In the illustrated ternary phase diagram, three regions R1, R2 and R3 are labeled where the region R2 is a corridor (Pb+SbSn) having characteristics of a lead (Pb) plus SbSn crystal structure. As an example, a lead (Pb) alloy of a tape may be selected from region R2.

In the ternary melt diagram, lead (Pb) at 100 percent by weight is shown in a lower left corner; while increasing weight percent of antimony (Sb) is illustrated upwardly to the right; and while increasing weight percent of tin (Sn) is illustrated horizontally to the right. The ternary melt diagram shows melting temperature contours which are generally increasing toward 100 percent by weight lead. As an example, a lead (Pb) alloy of lead alloy barrier tape 82 may be selected from the region shown in the ternary melt diagram based at least in part on melting temperature. In such an example, the selected lead (Pb) alloy can be an alloy of region R2 of the ternary phase diagram (noting that the ternary phase diagram is for about 109 degrees C.).

As an example, a suitable lead (Pb) alloy may include lead (Pb), tin (Sn) and antimony (Sb) and may comprise about 10 percent by weight tin (Sn) or less and about 10 percent by weight or less antimony (Sb); with the remainder substantially lead (Pb) (e.g., 80 percent by weight or more). According to another example, a suitable lead (Pb) alloy may include lead (Pb), tin (Sn) and antimony (Sb) and may comprise about 5 percent by weight tin (Sn) or less and about 5 percent by weight or less antimony (Sb); with the remainder substantially lead (Pb) (e.g., 90 percent by weight or more). According to another example, a suitable lead (Pb) alloy may include lead (Pb), tin (Sn) and antimony (Sb) and may comprise about 4 percent by weight tin (Sn) or less and about 4 percent by weight or less antimony (Sb); with the remainder substantially lead (Pb) (e.g., 92 percent by weight or more). In another example, a suitable lead (Pb) alloy may include lead (Pb), tin (Sn) and antimony (Sb) and may comprise about 0.5 to about 3 percent by weight tin (Sn) and about 1.5 to about 5 percent by weight or less antimony (Sb); with the remainder substantially lead (Pb) (e.g., about 92 to about 98 percent be weight).

Figure 7:
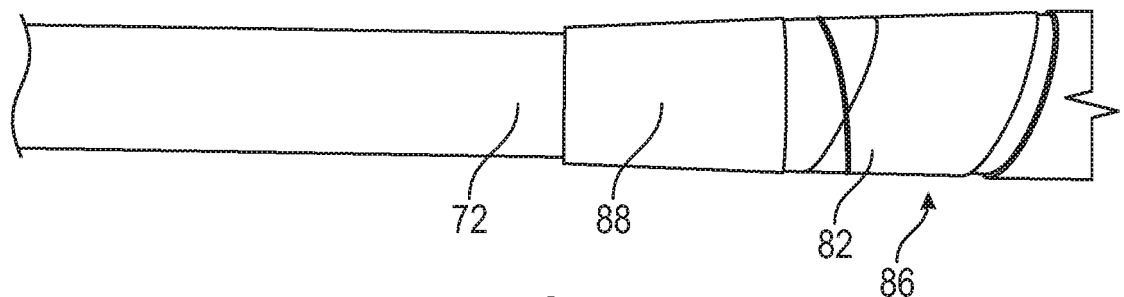
FIG. 7 is an illustration of a supplemental tape being applied during the splicing operation to protect the lead alloy barrier tape against unraveling, according to an embodiment of the disclosure.
Figure 8:
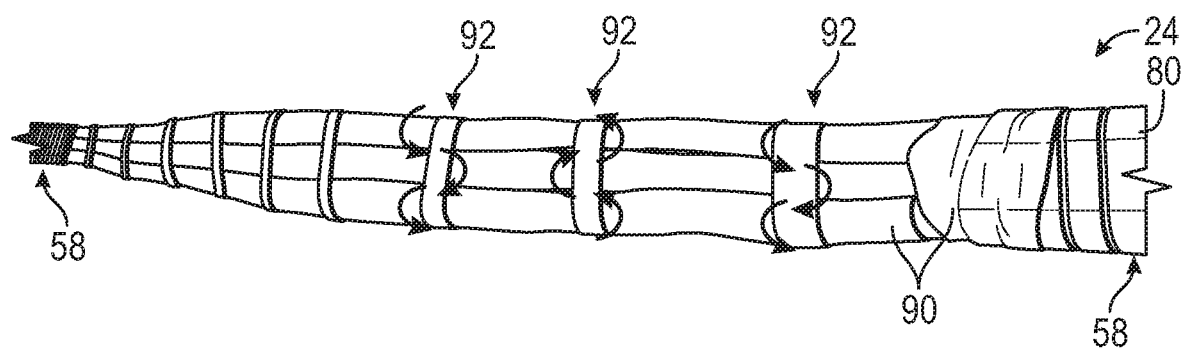
FIG. 8 is an illustration of protective tape being wrapped around the lead alloy barrier tape during the splicing operation to protect the lead alloy barrier tape, according to an embodiment of the disclosure.

As illustrated in FIG. 7, the ends of the wrapped lead alloy barrier tape 82 may be wrapped with a high modulus tape 88, e.g. a high modulus PTFE tape, to protect the wrapped lead alloy barrier tape 82 from unraveling. In addition to protecting against unraveling, the wraps of high modulus tape 88 protect the termination ends 84 against damage, thus eliminating a potential failure mode. Subsequently, high modulus tape layers 90, e.g. high modulus PTFE tape layers, may be applied, e.g. wrapped helically. The tape layers 90 are positioned around the lead alloy barrier tape 82 which, in turn, has been wrapped around each individual phase of the multi-phase conductor assembly 60 within splice 56, as illustrated in FIG. 8. It should be noted FIG. 8 illustrates a splice 56 being formed for a power cable 24 having a generally flat configuration but the same approach may be used for a power cable 24 having a generally round configuration, as illustrated in the round configuration of FIG. 2.

The high modulus tape layers 90 may be applied helically to reinforce and protect the layers of lead alloy barrier tape 82. These taped conductors may then be splinted by alternating the tape wraps to form alternated tape wraps 92 along the length of the region of splice 56, as also illustrated in FIG. 8. For round cables 24, additional material may be added and secured along the region of splice 56 to help fill voids within the splice between conductors 62.

Figure 9:
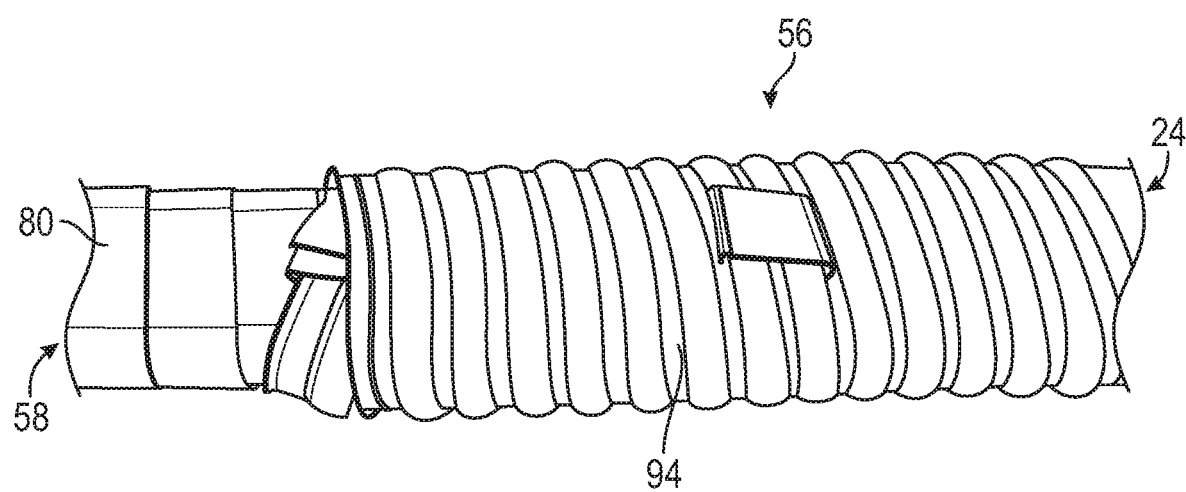
FIG. 9 is an illustration of metallic armor applied during the splicing operation, according to an embodiment of the disclosure.

In some embodiments, the high modulus tape layers 90 may then be covered with an insulating material, e.g. fiberglass tape, to provide padding. An armor material 94, e.g. metallic armor material, may then be wrapped along the region of splice 56 around spliced conductors 62 to provide mechanical protection, as illustrated in FIG. 9. By way of example, the metallic armor material 94 may be applied as a strip wrapped helically with the aid of, for example, a forming tool to maintain a tight wrap. The metallic armor material 94 may then be secured along the region of splice 56 by suitable retainers, such as self-hooking mechanical retention mechanisms, to avoid soldering. In some embodiments, the armor material 94 may be constructed in a plurality of layers, e.g. a plurality of metallic armor material layers. In the illustrated example, the armor material 94 is an external layer which collectively surrounds the plurality of phases.

This splicing methodology may be adapted to various types of power cables 24 for use in many environments, including downhole environments involving $H_2S$ and $CO_2$ gases. The approach enables splicing to be completed at locations near a well where it may not be practical to have an open flame or soldering iron. By way of example, the methodology also enables removal of soldering equipment when installing a field attachable penetrator with a pigtail splice.

According to one specific embodiment of the methodology, cable ends 58 are properly terminated and aligned. The copper conductors 62 from each cable end 58 are then joined followed by a deburring and polishing of the joined copper area. The ends of the protective lead layer 72 associated with each conductor 62 may then be deburred and polished to properly expose the lead ends. The high strain dielectric tape 81 may then be applied over the joined conductors 62. In some applications, various additional layers and/or components may be positioned over the joined conductors 62, e.g. a high modulus dielectric tape cylinder and a subsequent high modulus dielectric tape may be applied over the insulation and conductor area.

Layers of the lead alloy barrier tape 82 may then be wrapped around the insulation materials to extend from one end of the protective lead layer 72 to the other end for each phase. The lead alloy barrier tape 82 may then be compressed to activate the adhesive and a high modulus tape may be wrapped over the ends of the lead alloy barrier tape 82 to secure them in place. A high modulus tape may then be wrapped to provide splinting between the phases followed by application of a high modulus tape and fiberglass tape to provide protection and insulation. The armor layer 94, e.g. metallic armor layer, may then be wrapped over the group of phases and corresponding barrier tape 82 and insulated materials to complete the splice 56. Mechanical retention members, e.g. hooks, may be used to hold the metallic armor layer 94 in place along splice 56.

The number of phases/conductors in power cable 24 may vary. The number and type of insulative layers also may be selected according to the parameters of a given operation and/or environment in which the power cable 24 is utilized. The layers of insulation may be formed via insulating tapes or by other types of materials wrapped or otherwise positioned about each phase. The plurality of phases may be splinted or otherwise secured together by tape or other mechanisms prior to applying the layer of armor. Additionally, various types of materials may be used to adjust the conductors, protective layers, and insulative layers according to the anticipated environmental conditions.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of splicing, comprising:
   during a power cable repair operation near a well, joining corresponding ends of copper conductors located in a power cable;
   applying a high strain dielectric tape over the joined corresponding ends;
   wrapping a lead alloy tape over the dielectric tape along each copper conductor between ends of a lead barrier layer;
   compressing the lead alloy tape to ensure bonding of an acrylic based adhesive without use of a heat source;
   enclosing the conductors, wrapped in the lead alloy tape, with a high modulus tape; and
   providing an external armor over the high modulus tape.

2. The method as recited in claim 1, wherein joining corresponding ends comprises joining corresponding ends of three copper conductors in a multi-phase conductor assembly.

3. The method as recited in claim 1, wherein joining comprises deburring and polishing the corresponding ends.

4. The method as recited in claim 1, further comprising applying a high modulus dielectric tape cylinder over the high strain dielectric tape.

5. The method as recited in claim 1, wherein wrapping comprises helically wrapping.

6. The method as recited in claim 1, wherein wrapping comprises helically wrapping back and forth in a plurality of layers to create a cross pattern.

7. The method as recited in claim 1, further comprising using a tape to prevent unraveling of the lead alloy tape and to protect termination ends of the lead alloy tape.

8. A method, comprising:
   joining ends of corresponding conductors in a multi-phase power cable to form corresponding joined ends for each phase of the multi-phase power cable;
   applying a dielectric tape over the corresponding joined ends for each phase;
   wrapping a lead alloy tape over the dielectric tape for each phase until the lead alloy tape extends between protective lead layer ends of protective lead layers surrounding the corresponding conductors, the lead alloy tape having a Pb—Sn—Sb crystal structure, and wrapping the lead alloy tape over the dielectric tape forming a gas barrier layer without use of a heat source;
   using a high modulus tape to wrap ends of the lead alloy tape; and
   protecting the corresponding conductors with an external armor layer, the armor layer secured by a self-hooking mechanical retention mechanism without soldering, wherein the method is performed at a field location near a well.

9. The method as recited in claim 8, further comprising compressing the lead alloy tape to ensure bonding of an adhesive disposed between the lead alloy tape and the dielectric tape.

10. The method as recited in claim 8, wherein joining comprises joining ends of corresponding conductors in a three-phase power cable.

11. The method as recited in claim 8, wherein applying the dielectric tape comprises applying a high strain fluorinated ethylene propylene (FEP) tape.

12. The method as recited in claim 8, wherein using a high modulus tape comprises wrapping a polytetrafluoroethylene (PTFE) tape about the lead alloy tape.

13. The method as recited in claim 11, further comprising applying a high modulus dielectric tape cylinder over the dielectric tape.

\* \* \* \* \*